US011536543B2

United States Patent
Uyeno et al.

(10) Patent No.: US 11,536,543 B2
(45) Date of Patent: Dec. 27, 2022

(54) DIRECTED ENERGY (DE) WEAPON AND PASSIVE MILLIMETER WAVE (PMMW) IMAGER FOR TARGET TRACKING

(71) Applicant: Raytheon Company, Waltham, MA (US)

(72) Inventors: Gerald P. Uyeno, Tucson, AZ (US); Sean D. Keller, Tucson, AZ (US); Benn Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 411 days.

(21) Appl. No.: 16/773,257

(22) Filed: Jan. 27, 2020

(65) Prior Publication Data

US 2021/0231413 A1 Jul. 29, 2021

(51) Int. Cl.
*F41H 13/00* (2006.01)
*G01S 17/10* (2020.01)
(Continued)

(52) U.S. Cl.
CPC .......... *F41H 13/0062* (2013.01); *G01S 3/043* (2013.01); *G01S 3/48* (2013.01);
(Continued)

(58) Field of Classification Search
CPC ..... G01V 8/005; G01S 13/003; G01S 13/865; G01S 13/867; G01S 17/10; G01S 17/66;
(Continued)

(56) References Cited

U.S. PATENT DOCUMENTS 6,621,764 B1 * 9/2003 Smith ................ G01S 17/86
367/128
6,809,307 B2 10/2004 Byren et al.
(Continued)

FOREIGN PATENT DOCUMENTS

| EP | 3486404 A2 | 5/2019 |
| WO | WO-2008108860 A2 | 9/2008 |
| WO | WO-2021154322 A1 | 8/2021 |

OTHER PUBLICATIONS

"International Application Serial No. PCT/US2020/032469, International Search Report dated Feb. 26, 2021", 5 pgs.
(Continued)

*Primary Examiner* — Arman B Fallahkhair
(74) *Attorney, Agent, or Firm* — Schwegman Lundberg & Woessner, P.A.

(57) ABSTRACT

A DE energy weapon and tracking system includes a passive millimeter wave (PmmW) imaging receiver on a common gimbaled telescope to sense natural electromagnetic radiation from a mmW scene. The PmmW imaging receiver operates in a portion of the electromagnetic spectrum distinct from the IR bands associated with thermal blooming or the HEL laser. In the case of a HPM source, the reflected energy is either in a different RF band and/or of diminished amplitude such as to not interfere with operation of the PmmW imaging receiver. Although lower resolution than traditional optical imaging, PmmW imaging provides a viable alternative for target tracking when the DE weapon is actively prosecuting the target and provides additional tracking information when the DE weapon is not engaged.

17 Claims, 6 Drawing Sheets

(51) Int. Cl.
*G01V 8/00* (2006.01)
*G01S 17/66* (2006.01)
*G01S 3/48* (2006.01)
*G01S 3/04* (2006.01)
*G01S 17/87* (2020.01)

(52) U.S. Cl.
CPC .............. *G01S 17/10* (2013.01); *G01S 17/66* (2013.01); *G01S 17/87* (2013.01); *G01V 8/005* (2013.01); *F41H 13/0068* (2013.01)

(58) Field of Classification Search
CPC .......... G01S 17/87; G01S 3/043; G01S 3/046; G01S 3/48; G01S 3/7864; F41H 13/0062; F41H 13/0068; F41G 3/165; F41G 7/224
See application file for complete search history.

(56) References Cited

U.S. PATENT DOCUMENTS

| | | | |
|---|---|---|---|
| 6,849,841 B2 | 2/2005 | Byren et al. | |
| 8,049,173 B1 | 11/2011 | Brown | |
| 8,188,905 B2* | 5/2012 | Gallivan | F41G 3/165 |
| | | | 315/32 |
| 8,203,109 B2 | 6/2012 | Taylor et al. | |
| 8,218,589 B1 | 7/2012 | Saunders | |
| 8,245,928 B2* | 8/2012 | Warren | F41H 11/02 |
| | | | 235/411 |
| 8,285,533 B2 | 10/2012 | Ahrens et al. | |
| 8,362,410 B2* | 1/2013 | King | G02B 26/0816 |
| | | | 250/203.6 |
| 8,371,201 B2* | 2/2013 | Deflumere | F41G 7/2293 |
| | | | 89/1.11 |
| 8,767,192 B2* | 7/2014 | Crouch | H01Q 3/2647 |
| | | | 356/5.1 |
| 8,941,061 B2* | 1/2015 | Gopalsami | G01K 11/006 |
| | | | 250/336.1 |
| 9,525,489 B2 | 12/2016 | Schuetz et al. | |
| 9,800,346 B2 | 10/2017 | Schuetz et al. | |
| 10,164,712 B2 | 12/2018 | Schuetz et al. | |
| 10,310,086 B2* | 6/2019 | Kalender | F41H 13/0062 |
| 10,401,499 B2* | 9/2019 | Marron | H04N 7/183 |
| 10,444,328 B1* | 10/2019 | Saunders | G01S 17/66 |
| 2014/0368814 A1 | 12/2014 | Krupkin et al. | |

OTHER PUBLICATIONS

"International Application Serial No. PCT/US2020/032469, Written Opinion dated Feb. 26, 2021", 8 pgs.

Schuetz, Christopher, et al., "A Promising Outlook for Imaging Radar: Imaging Flash Radar Realized Using Photonic Spatial Beam Processing", IEEE Microwave Magazine, vol. 19, No. 3, (Apr. 4, 2018), 91-101.

Dennis W. Prather, "5G Moves into the light: Holographic massive MIMO," ComSoc Technology News, http://www.comsoc.org/ctn/5g-moves-into-light-holographic-massive-mimo, Jun. 2016, pp. 1-5.

Macario et al., "Full spectrum millimeter-wave modulation," Oct. 8, 2012 / vol. 20, No. 21 / Optics Express, pp. 23623-23629.

Schneider et al., "Radiofrequency signal-generation system with over seven octaves of continuous tuning," http://www.nature.com/doifinder/10.1038/nphoton.2012.339, pp. 1-5.

Wang et al., "Photonic Generation of High Fidelity RF Sources for Mobile Communications," DOI 10.1109/JLT.2017.2707411, Journal of Lightwave Technology, 2016, pp. 1-7.

Deroba et al., "Smart Antenna Using Element-level Photonic Upconversion to Generate an Apodized Beam-space for Increased Spatial Isolation," IEEE Antennas and Wireless Propagation Letters, vol. ??, 2017, pp. 1-4.

Shi et al., "Ultrawideband Optically Fed Tightly Coupled Phased Array," Journal of Lightwave Technology, vol. 33, No. 23, Dec. 1, 2015, pp. 4781-4790.

Shi et al., "Conformal Wideband Optically Addressed Transmitting Phased Array With Photonic Receiver," Journal of Lightwave Technology, vol. 32, No. 20, Oct. 15, 2014, pp. 3468-3477.

Murakowski et al., "Photonic probing of radio waves for k-space tomography," vol. 25, No. 14 | Jul. 10, 2017 | Optics Express, pp. 15746-15759.

Schuetz et al., "A Promising Outlook for Imaging Radar," IEEE Microwave Magazine, May 2018, pp. 91-101.

* cited by examiner

DIRECTED ENERGY (DE) WEAPON AND PASSIVE MILLIMETER WAVE (PMMW) IMAGER FOR TARGET TRACKING

BACKGROUND OF THE INVENTION

Field of the Invention

This invention relates to directed energy (DE) weapon systems such as high-energy laser (HEL) and high power microwave (HPM) and the sensor architectures used for target tracking.

Description of the Related Art

Directed energy weapons and specifically high-energy laser (HEL) and high power microwave (HPM) weapons are being considered for a variety of military applications with respect to a variety of platforms, e.g., spaceborne, airborne and land based systems to name a few. These weapons generally involve the use of the laser, microwave or other source of a high-energy beam to prosecute a target.

In a HEL system, in an active prosecution mode the laser needs to be maintained on a specific area of the target for a period of time to be effective. Atmospheric compensation using adaptive optics significantly reduces the time the high-energy laser must be maintained on the target. For moving targets, HELs require an active target tracking system so that the HEL "spot" moves along with the target (or equivalently, does not move with respect to the target). Typically an additional, lower energy, laser source is paired with the HEL to provide angle and/or range information to track the target as it moves. This laser is often called a target or tracker illuminator (TIL). The TIL can be a separate wavelength from the HEL, so that a portion of the reflected HEL signal from the target may be filtered out before being detected by an optical detector array. In some cases, the reflected power of the HEL simply saturates the optical detector.

TIL sources are often in the infrared wavelengths, e.g., near IR (NIR) or short wave IR (SWIR) bands, which presents a problem for tracking engaged targets. As the HEL engages the target, the spot illuminated by the HEL heats up and causes an effect known as thermal blooming. Thermal blooming is the increase in IR signature due to an increase in temperature, and causes the TIL sensors to lose track of the HEL spot on the target (for larger targets), or lose track of the target entirely (for smaller targets such as UAVs). Both have the effect of the HEL system not properly engaging their target. Thermal blooming also prevents maintaining an aimpoint and performing battle damage assessment (BDA) on the target while the HEL is engaged.

In an HPM system, the microwave source illuminates a broad area in an active prosecution mode. Atmospheric correction is not an issue at RF frequencies. Therefore, target tracking does not have to be as precise to provide atmospheric compensation, precise focus and precise engagement. An optical detector array, active TIL or passive, provides external target tracking queues to the HPM system.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a DE energy weapon and tracking system that is immune to the effects of thermal blooming and in-band electromagnetic reflections that plague traditional optical tracking systems. This is accomplished by integrating the DE weapon with a passive millimeter wave (PmmW) imaging receiver on a common gimbaled telescope to sense natural electromagnetic radiation from a mmW scene. The PmmW imaging receiver operates in a portion of the electromagnetic spectrum distinct from the IR bands associated with thermal blooming or the HEL laser. In the case of a HPM source, the reflected energy is either in a different RF band and/or of diminished amplitude such as to not interfere with operation of the PmmW imaging receiver. Although lower resolution than traditional optical imaging, PmmW imaging provides a viable alternative for target tracking when the DE weapon is actively prosecuting the target and provides additional tracking information when the DE weapon is not engaged.

In an embodiment, a DE weapon and tracking system is mounted on a gimbaled telescope configured to slew and point an axis at a target. A DE weapon includes a source of electromagnetic energy such as a HEL or HPM source for generating and transmitting a directed energy beam through a first aperture on the telescope to prosecute the target in an active prosecution mode. A passive millimeter wave (PmmW) imaging receiver is configured to form on an optical detector array, an optical image of a mmW scene within a field of view of the receiver from the mmW signals received through a second aperture on the telescope. A processing circuit is configured to process the optical image to provide real-time assessment of target tracking without effects of thermal blooming during the active prosecution mode. For example, the processing circuit may maintain an aimpoint on the target or extract battle damage assessment (BDA) of the target with an area on the target illuminated by the DE beam based on received mmW signals.

In an embodiment, the PmmW imaging receiver comprises a phased-array antenna including a plurality of antenna elements mounted within the telescope and arranged in a first pattern configured to receive mmW signals from natural electromagnetic radiation through the second aperture of a mmW scene within a field of view of the PmmW imaging receiver. A plurality of electro-optic modulators corresponds to the plurality of antenna elements, each modulator configured to modulate an optical carrier with a received mmW signal to generate a plurality of modulated optical signals. A plurality of optical channels are configured to carry the plurality of modulated optical signals, each of the plurality of optical channels having an output to emanate the corresponding modulated optical signal out of the corresponding optical channel, the outputs of the plurality of optical channels arranged in a second pattern corresponding to the first pattern. A first composite signal channel, adjacent to the plurality of outputs of the plurality of optical channels, is configured to receive the plurality of modulated optical signals to form a first composite optical signal. The optical detector array is configured to receive at least a portion of the composite optical signal and to extract a first optical image of the mmW scene including at least the portion of the target within the directed energy beam.

In an embodiment, the tracking system combines the PmmW imaging receiver with an optical imaging receiver coupled to an optical aperture on the telescope. The same or different optical detector array may be configured to form a second optical image of an optical scene within a field of view of the optical imaging receiver to provide real-time target tracking based on received optical signals. The optical imaging receiver provides higher or finer resolution than the PmmW imaging receiver but may have limited use when the DE weapon is engaged. Embodiments may include an optical transmitter that can be used to provide active optical imaging and/or as a source for determining a range to target. In the case of a HEL system, the DE weapon, optical imaging receiver and range finder may share the same optical aperture on the telescope and a common signal path.

These and other features and advantages of the invention will be apparent to those skilled in the art from the following detailed description of preferred embodiments, taken together with the accompanying drawings, in which:

DETAILED DESCRIPTION OF THE INVENTION

The detailed description set forth below in connection with the appended drawings is intended as a description of exemplary embodiments of a DE weapon and tracking system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

A DE energy weapon and tracking system includes a passive millimeter wave (PmmW) imaging receiver on a common gimbaled telescope that senses natural electromagnetic radiation from a mmW scene that includes one or more targets. The PmmW imaging receiver is immune to the effects of thermal blooming and in-band electromagnetic reflections that plague traditional optical tracking systems. The PmmW imaging receiver operates in a portion of the electromagnetic spectrum distinct from the IR bands associated with thermal blooming or the HEL laser. In the case of a HPM source, the reflected energy is either in a different RF band and/or of diminished amplitude such as to not interfere with operation of the PmmW imaging receiver. Although lower resolution than traditional optical imaging, PmmW imaging provides a viable alternative for target tracking when the DE weapon is actively prosecuting the target and provides additional tracking information when the DE weapon is not engaged.

Figure 1:
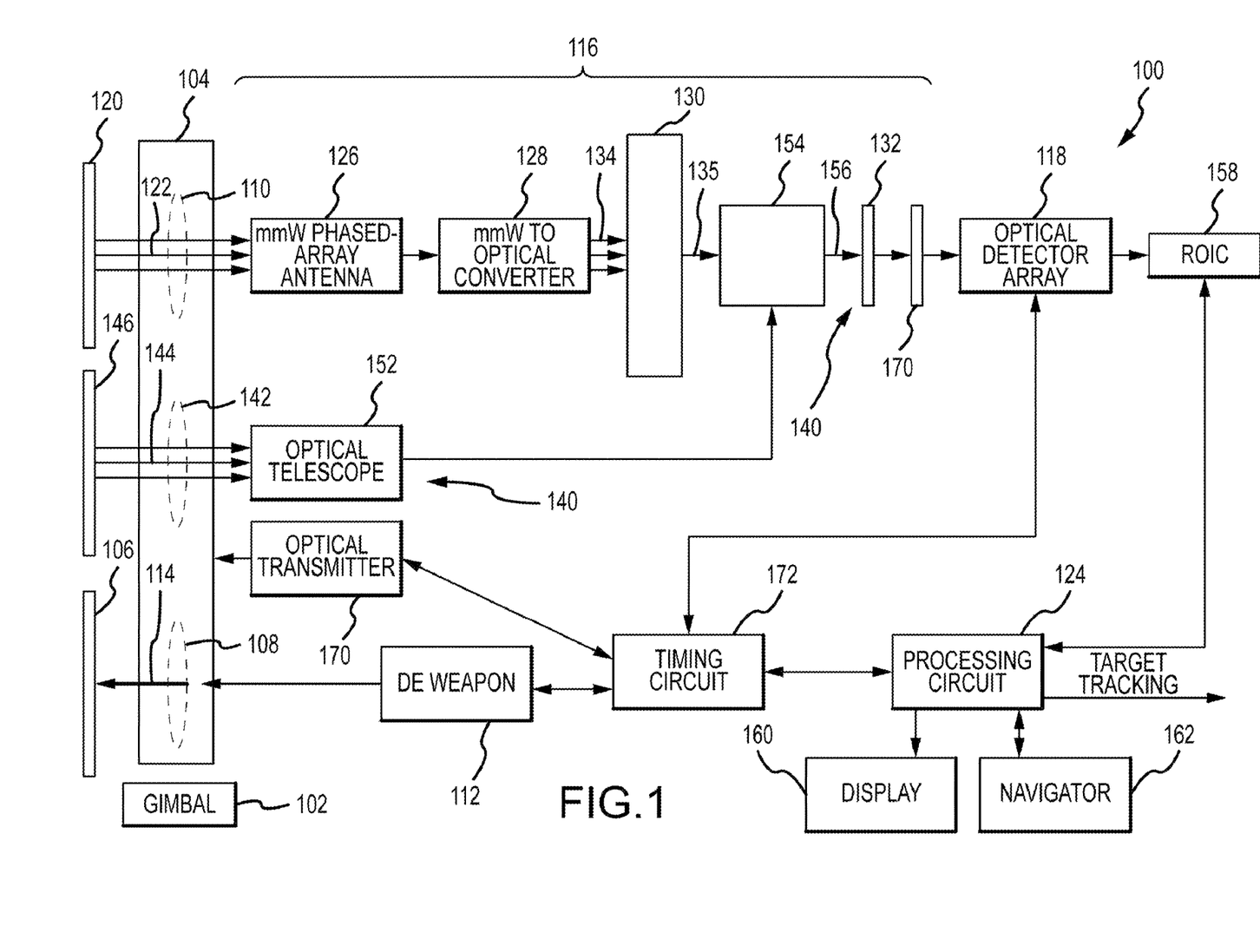
FIG. 1 is a block diagram of an embodiment of a DE weapon and PmmW and optical imagers for target tracking.

Referring now to FIG. 1, an embodiment of a DE weapon and tracking system 100 include a gimbal 102 configured to slew and point an axis of a telescope 104 at a target 106. Telescope 104 includes at least first and second apertures 108 and 110, respectively. A DE weapon 112 includes a source of electromagnetic energy e.g., laser or microwave, for generating and transmitting a directed energy beam 114 through the first aperture 108, which depending on the source may be either an optical or electronic aperture, to prosecute the target 106 in an active prosecution mode. A passive millimeter wave (PmmW) imaging receiver 116 is configured to form on an optical detector array 118, a first optical image of a mmW scene 120 within a field of view of the receiver from mmW signals 122 received through the second aperture 110, which is an electronic aperture. A processing circuit 124 is configured to process the optical image to provide real-time assessment of target tracking without effects of thermal blooming during the active prosecution mode.

PmmW imaging receiver 116 is a subsystem that receives and processes electromagnetic radiation in the mmW band including frequencies between 30 GHz and 300 GHz in a manner making possible the reconstruction of an image of the mmW scene 120. A mmW phased-array antenna 126, a mmW to optical converter 128, an optical imager 130, and optical detector optics 132 (which may include a lens) together form the PmmW imaging receiver 116. Phased-array antenna 126 includes a plurality of antenna elements mounted within the telescope and arranged in a first pattern configured to receive mmW signals 122 from natural electromagnetic radiation through the second aperture 110 of mmW scene 120 within a field of view of the PmmW imaging receiver. The mmW to optical converter 128 includes a plurality of electro-optic modulators corresponding to the plurality of antenna elements. Each modulator is configured to modulate an optical carrier with a received mmW signal to generate a plurality of modulated optical signals. A plurality of optical channels 134 (such as optical fibers) are configured to carry the plurality of modulated optical signals. Each of the plurality of optical channels having an output to emanate the corresponding modulated optical signal out of the corresponding optical channel with the outputs of the plurality of optical channels arranged in a second pattern corresponding to the first pattern. The patterns "correspond" when the physical arrangement of the optical fibers is the same as the physical arrangement of the antenna elements. The spacing of the optical fibers and antenna elements is different due to the different wavelengths. Optical imager 130 includes a first composite signal channel, adjacent to the plurality of outputs of the plurality of optical channels, configured to receive the plurality of modulated optical signals to form a first composite optical signal 135. The optical detector array 118 is configured to receive at least a portion of the composite optical signal and to extract the first optical image of the mmW scene including at least the portion of the target within the directed energy beam 114.

The PmmW imaging receiver 116 provides the "core" imaging capability of the DE weapon system's tracking system. The PmmW imaging receiver is not susceptible to either thermal blooming of the target caused by engagement of the DE weapon nor reflections of the DE beam off of the target. Although of lower resolution than optical imaging systems, the resolution of the mmW band should be sufficient to provide required target tracking information whether the DE weapon is actively prosecuting the target or not. In particular, the PmmW imaging supports maintaining an aimpoint on the target or extracting battle damage assessment (BDA) of the target with an area on the target illuminated by the DE beam based on received mmW signals.

The architecture of the PmmW imaging receiver converts received mmW signals to corresponding optical signals to leverage compact lightweight optical components, optical detection and optical processing capabilities. Only the front end phased-array antenna is implemented in the mmW region of the electromagnetic spectrum. Implementation of an end-to-end mmW imaging system would be bulky, expensive and beyond the processing capabilities of current electronics. A more complete description of an exemplary architecture is described in Christopher A. Schuetz et. al "A Promising Outlook for Imaging Radar: Imaging Flash Radar Realized Using Photonic Spatial Beam Processing" IEEE Microwave Magazine, vol. 19.3.91-101 (2018) and in related U.S. Pat. No. 10,164,712 entitled "Phased-Array Radio Frequency Receiver" issued Dec. 25, 2018 the contents of which are hereby incorporated by reference.

This architecture allows for integration of the mmW imaging capabilities with more traditional optical capabilities such as passive or active optical imaging, ladar range finding (e.g. LADAR) as well as with the DE weapon itself in the case of a HEL source. This integration may reduce size, weight and cost of the DE weapon and tracking system without sacrificing performance. Furthermore, the tracking system now has the benefit of imaging capabilities in both the optical and mmW bands. Optical imaging provides tracking information based on visible and/or IR features of a target whereas mmW imaging provides tracking information based on mmW features such as varying material densities, or presence of metal within an object. For example, if the target is a missile in flight, optical imaging may detect the thermal signature of the body of the missile and the exhaust whereas mmW may detect seems and joints within the airframe, or the location of electronic components within the body. When the DE weapon is not engaged in an active operation mode, the system can fuse both the optical and mmW tracking information. When the DE weapon is engaged in an active operation mode, the system may use only the mmW tracking information.

Referring again to FIG. 1, an embodiment for integrating traditional optical capabilities includes an optical imaging receiver 140 coupled to an optical aperture 142 to receive optical signals 144 from an optical scene 146. An optical telescope 150 and detector optics 132 (shared with the PmmW imaging receiver) form the optical imaging receiver 140.

An optical beam combiner 154 combines the composite optical signal 135 with received optical signals 144 in a common signal path 156. As used herein, an "optical beam combiner" is any passive optical system that has at least two inputs and at least one output, the light at the output being a linear combination of the light at the inputs. It may be a partially silvered mirror, for example, or it may include powered elements such as lenses. In some embodiments, it may include, for example, a grating or prism to combine different wavelengths.

The optical imaging receiver 140 and the one or more optical beam combiners 154, optical detector array 118, and the processing circuit 124 being together configured to form, on the optical detector array, a second optical image of optical scene 146 within a field of view of the optical imaging receiver. The processing circuit is configured to process the first and second optical images to provide real-time assessment of target tracking of the target based on both the received mmW and received optical signals.

Each detector in the optical detector array 118 converts the received light into electric charge. A read out integrated circuit 158 measures the electric charge over a specified interval and outputs digital signals proportional to the charge. The processing circuit 124 converts this digital signal into the proper format to create an optical image of the scene on a display 160 for human-in-the-loop operation or a navigator 162 for autonomous operation. The optical detector array 118 may periodically be reset and the time interval between any such reset, and a subsequent read-out of the cumulative photon detections since the reset may be referred to as a "frame". The processing circuit 124 may receive data from the detectors in the optical detector array 118 from the read out integrated circuit 158 and cause the display 160 to display images of the optical scene 146 or the mmW scene 120.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single circuit wiring board (PCB) or distributed over several interconnected PCBs. A processing circuit may contain other processing circuits; for example a processing circuit may include two processing circuits, an FPGA and a CPU, interconnected on a PCB.

Figure 2:
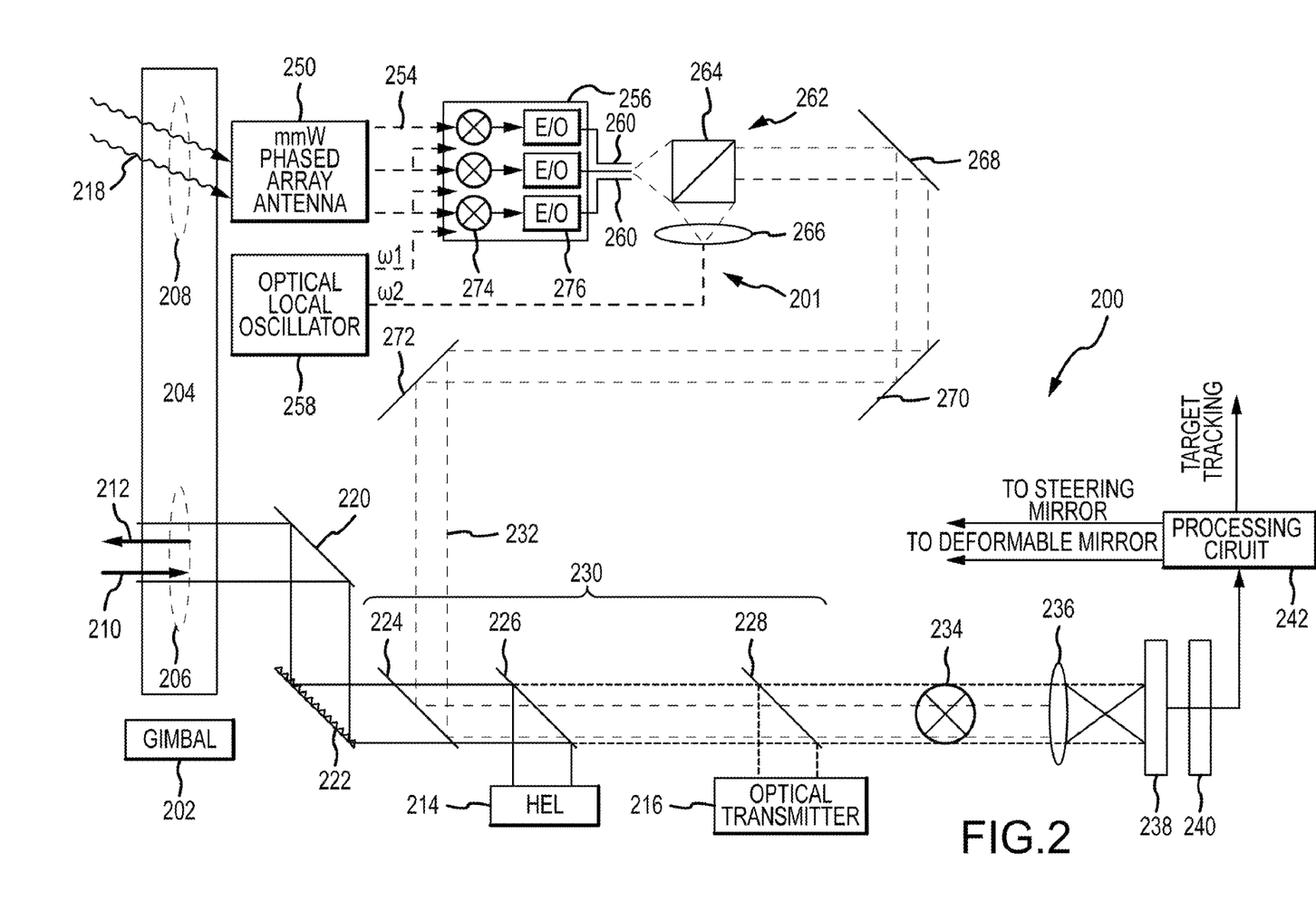
FIG. 2 is an embodiment of HEL DE weapon and PmmW and optical imagers for target tracking.
Figure 3A:
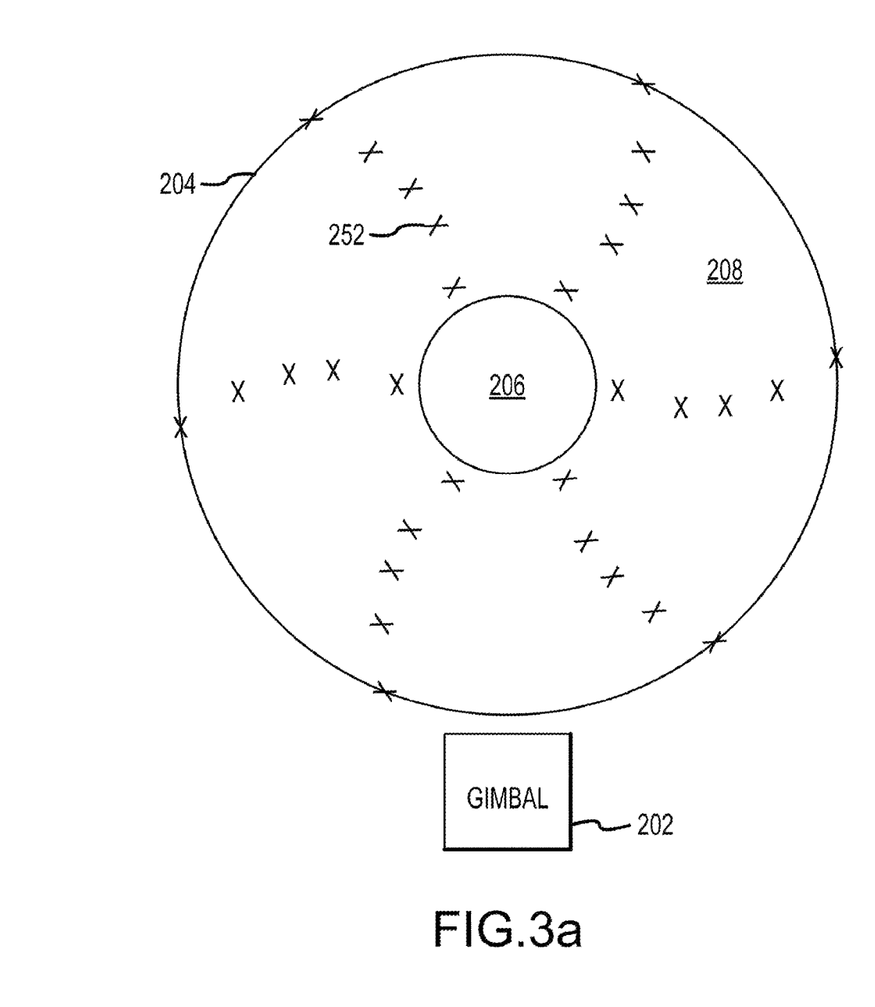
FIGS. 3a and 3b are axial and side views of the gimbaled telescope including both an optical aperture and electronic aperture.
Figure 3B:
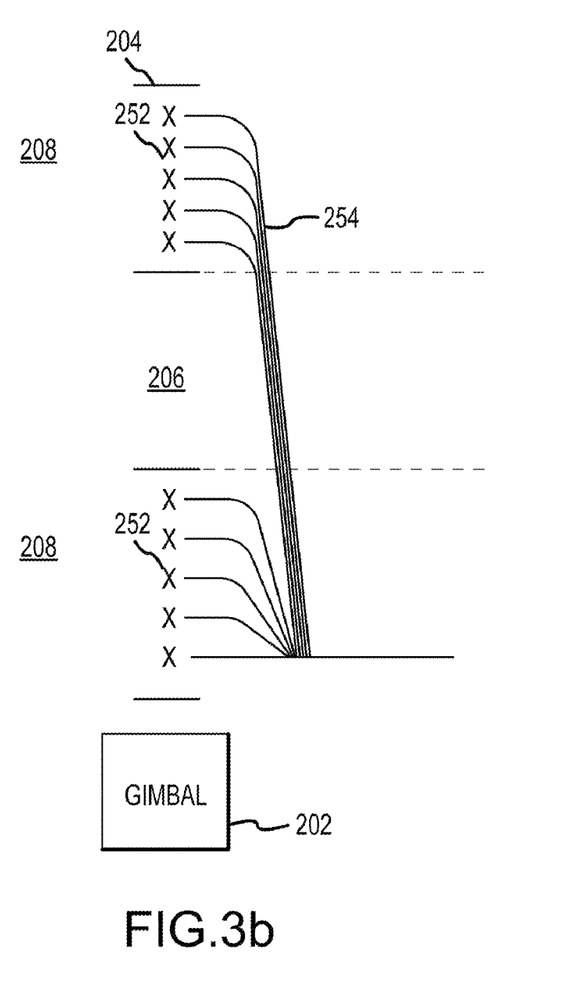
Figure 4A:
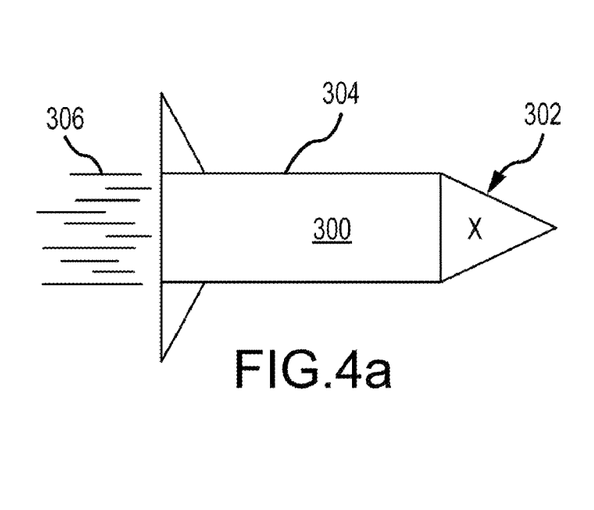
FIGS. 4a and 4b are simplified illustrations of images of a target in the SWIR and mmW bands when the HEL is not engaged with the target.
Figure 4B:
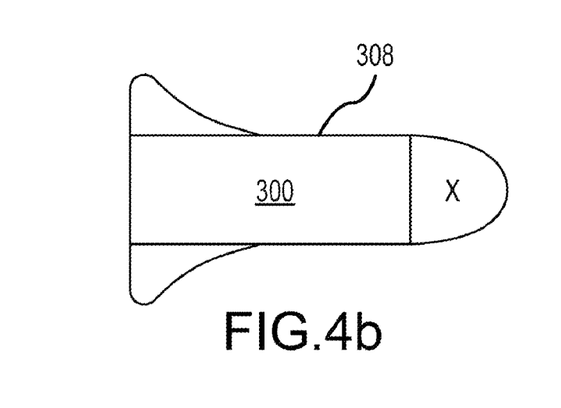
Figure 5A:
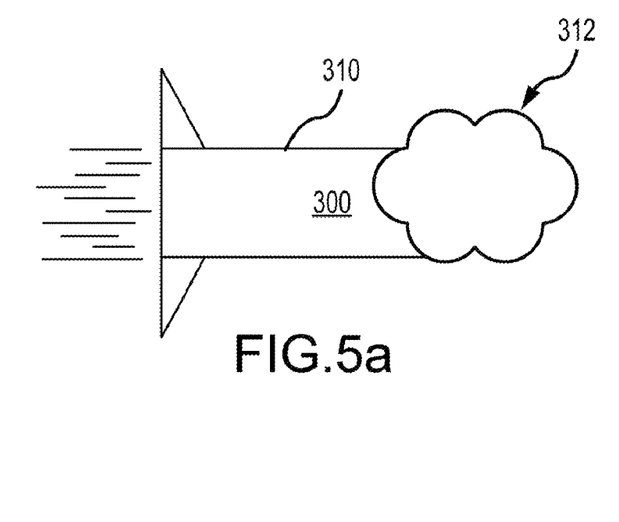
FIGS. 5a and 5b are simplified illustrations of images of a target in the SWIR and mmW bands when the HEL is engaged with the target.
Figure 5B:
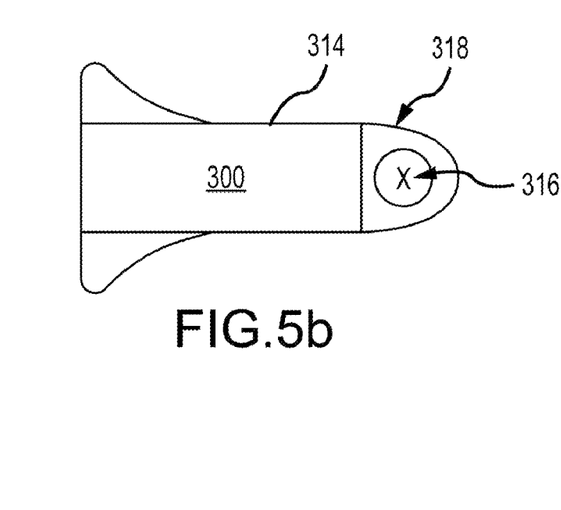

In some embodiments, the optical detector array 118 may simultaneously receive both mmW signals 122 and optical signals 144 to display an image as a superposition of an image of the mmW scene 120 and an image of the optical scene 146. In other embodiments, an image separation circuit may be employed to separate images corresponding to the mmW signals and the optical signals. For example, if the wavelength bands of the optical signals received at the optical detector array 118 from the mmW and optical channels differ, an optical detector filter 170 may be employed between the optical detector optics 132 and the optical detector array 118 to separate the signals in time or space. If the optical detector filter 170 is implemented as a filter wheel with two bandpass filters, each corresponding to one of the two wavelength bands, the mmW and optical signals can be time multiplexed onto a single optical detector array 118. Alternately, if the optical detector filter 170 is implemented as an interleaver that physically separates the mmW and optical filters, the mmW and optical signals can be spatially multiplexed onto a pair of optical detector arrays 118. In a related embodiment, the optical detector array 118 may itself be wavelength selective, having for example an array of dual-band pixels, each of which is sensitive in different bands (corresponding to the mmW and optical channels respectively) under different bias conditions. In some embodiments, the sensing system includes an optical transmitter 172 (e.g., an infrared (IR) transmitter) to illuminate the optical scene 146. Optical transmitter 172 may be used to create an active optical sense mode and/or to facilitate ranging to the target. The ranging circuit may include a timing circuit 174 for controlling the timing of pulses transmitted by the optical transmitter 172, and for controlling the optical detector array 118 and read out integrated circuit 158 to perform accurate time of flight measurements. There are many different techniques to separate the mmW and optical signals, passive or active, and to implement the separation circuit for read out of the images of the mmW and optical scenes. For a complete recitation of these various techniques, one is directed to co-pending U.S. patent application Ser. No. 16/276,537 entitled "Optical and Radio Frequency Sensor" filed on Feb. 14, 2019, which is hereby incorporated by reference. Referring now to FIGS. 2 and 3a-3b, an embodiment of a DE weapon and tracking system 200 uses a HEL as the source for the DE weapon and combines a PmmW imaging receiver 201 with active/passive optical imaging and laser range finding to provide target tracking information. A gimbal 202 is configured to slew and point an axis of a telescope 204 including an optical aperture 206 and an electronic aperture 208 at a target. Optical aperture 206 allows light 210, passive or reflected, from the target to enter and internally generated light 212 such as from a HEL 214 for generating and transmitting a directed energy beam or an optical transmitter 216 to exit. Electronic aperture 208 allows mmW emissions 218 from the target to enter.

An optical channel is coupled to optical aperture 206 to facilitate light entering or exiting optical aperture 206. The optical channel may include a steering mirror 220 that is configured as a fast moving morrow with X and Y control to assist in pointing the directed energy beam toward the target and a deformable mirror 222 configured as an adaptive optical element that can change shape to correct for wavefront errors in the directed energy beam, either through atmospheric effects or optical elements, to maximize power on the target.

Aperture sharing elements 224, 226 and 228 are used to combine and/or separate multiple optical channels into a common signal path 230. These elements may be dichroic elements and may require that the multiple optical channels have different optical wavelengths or bands. Aperture sharing element 226 combines the directed energy beam into the common signal path 230, which is directed off of the deformable mirror 222 and steering mirror 220 to direct maximum power onto the target. The directed energy beam suitably is centered in a different optical band than the active or passive optical light from the target. Aperture sharing element 228 combines low power optical energy (e.g., a laser beam) from optical transmitter 216 into the common signal path 230, which is also directed off of the deformable mirror 222 and steering mirror 220 to illuminate the target. Aperture sharing element 224 combines a composite optical signal 232 from the PmmW imaging receiver 201 that represents a mmW band image of the target into the common signal path 230. The composite optical signal 232 is suitable centered in a different optical band than the active or passive optical light 210 from the target.

A filter wheel 234 with two bandpass filters, each corresponding to one of the two wavelength bands for the composite optical signal 232 and optical light 210, alternately passes one wavelength band and then the other to time multiplex the received mmW and optical signals through optical detector optics 236 onto a single optical detector array 238 to alternately form a first optical image of a mmW scene and a second optical image of an optical scene. A ROIC 240 reads out the images from the optical detector array 238 and provides them to a processing circuit 242 configured to process the first and second optical images to provide real-time assessment of target tracking. Processing circuit 242 is also configured to provide control signals to the steering mirror 220 to provide fine pointing adjustments and to deformable mirror 222 to provide waveform corrections. The system may also include a wavefront sensor (not shown) that measures the wavefront error produced by air turbulence between the HEL and the target. This data is provided to processing circuit 242 and used to control deformable mirror 222.

An mmW channel is coupled to electronic aperture 208 to facilitate mmW emissions 218 entering electronic aperture 208. The mmW channel includes a mmW phased array antenna 250 with a plurality of mmW antenna elements 252 positioned on the telescope 204 within electronic aperture 208 in a first pattern. The received mmW signals at each antenna element 252 are suitably routed via a wire 254 to mmW to optical upconverter 256, which is fed by an optical local oscillator signal col from an optical local oscillator 258 and upconverts each mmW signal to a corresponding modulated optical signal. A plurality of optical channels 260 (such as optical fibers) are configured to carry the plurality of modulated optical signals. Each of the plurality of optical channels having an output to emanate the corresponding modulated optical signal out of the corresponding optical channel with the outputs of the plurality of optical channels arranged in a second pattern corresponding to the first pattern. An optical imager 262 provides a first composite signal channel, adjacent to the plurality of outputs of the plurality of optical channels 260, configured to receive the plurality of modulated optical signals to form the composite optical signal 232. Optical imager 262 includes an optical beam combiner 264 having a first input couple to the outputs of the plurality of optical channels 260 arranged in the second pattern and a second input fed by optical local oscillator signal $\omega 2$ from optical local oscillator 258. An optic 266 images the optical local oscillator signal $\omega 2$ onto the beam combiner. Optical elements 268, 270 and 280 redirect composite optical signal 232 to aperture sharing element 224 to inject composite optical signal 232 into the common signal path 230.

In some embodiments, the mmW to optical converter 256 includes a corresponding plurality of electrical components such as low noise amplifiers and/or filters, 274 and an array of electro-optical (E/O) modulators 276. Each E/O modulator 276 has an optical local oscillator input fed by an optical local oscillator signal w1 from an optical local oscillator 258, a modulation input, and an output. In some embodiments, each E/O modulator 276 is a phase modulator, which may include a nonlinear crystal (e.g., a lithium niobate crystal) the index of refraction of which depends on an electric field applied across it. In operation, a mmW tone received by one of the antenna elements 252, amplified by one of the low noise amplifiers and input to one of the E/O modulators 276 may cause phase modulation of the optical local oscillator signal, resulting, at the output of the E/O modulator 276, in a signal (the modulated optical signal) including a carrier component, an upper sideband, and a lower sideband. For large modulation depth, other sidebands may also be present, and the carrier may be suppressed (or entirely absent, if the modulation depth corresponds to a zero of the zeroth Bessel function of the first kind).

The phase of the upper sideband may be equal to the sum of the phase of the optical local oscillator signal and the phase of the mmW tone. The output of each phase modulator may be connected to a filter (e.g., a high-pass or band-pass filter) that allows the upper modulation sideband to pass and rejects or blocks the carrier and the lower modulation sideband. As such, each of the modulators in such an embodiment acts as a phase-preserving frequency converter. An amplitude modulator (e.g., an electro-absorption modulator or a Mach-Zehnder interferometer having a phase modulator in each arm, the phase modulators being driven in opposite directions by the radio frequency modulating signal), similarly followed by a filter that passes one modulation sideband while blocking the carrier and the other modulation sideband, may similarly act as a phase-preserving frequency converter.

The phase-preserving property of the phase-preserving frequency converters may make it possible to form, on the optical detector array 238, an optical image of the mmW scene on the target. For example, near-planar mmW waves received by the phased array antenna 250 from a distant mmW point source may have a phase that varies nearly linearly across the antenna elements of the array antenna, with a phase slope across the array antenna corresponding to the direction from which the waves arrive. This phase slope may be preserved at the outputs of the mmW to optical converter 256, causing the optical detector optics 236 to focus the optical signal at the output of the mmW frequency to optical converter 256 to a single detector in the optical detector array 238, the location of the point corresponding to the direction from which the mmW waves arrive at the phased array antenna 250.

Referring now to FIGS. 4a-4b and 5a-5b, in an inactive prosecution mode in which the DE weapon is not engaged with a target 300, an image 302 of an optical scene e.g. optical emissions or reflections of a missile provides high-resolution features 304 of the missile as well as its exhaust plume 306 while an image 308 of a mmW scene e.g. natural mmW emissions of the missile provides lower-resolution features of the missile. Although lower-resolution, the mmW imager may detect features such as joints, seams, or changes in material density on the missile not visible to the optical sensor. During the inactive prosecution mode, the system can fuse the images of the optical and mmW scenes to access a richer feature set than either sensor can provide individually. In an active prosecution mode in which the DE weapon is engaged with target 300, an image 310 of the optical scene is at least partially obscured by thermal blooming 312 associated with heating of at least a portion of the missile. Unfortunately the obscured portion of the missile is that portion engaged by the DE weapon that would include the aimpoint for ongoing tracking and prosecution and the area where battle damage assessment (BDA) would be desirable in real-time. Fortunately, an image 314 of the mmW scene is not affected by thermal blooming. The use of the mmW imaging sensor allows for maintenance of an aimpoint 316 and a BDA 318 in real-time as the DE weapon is engaged with the target.

Figure 6:
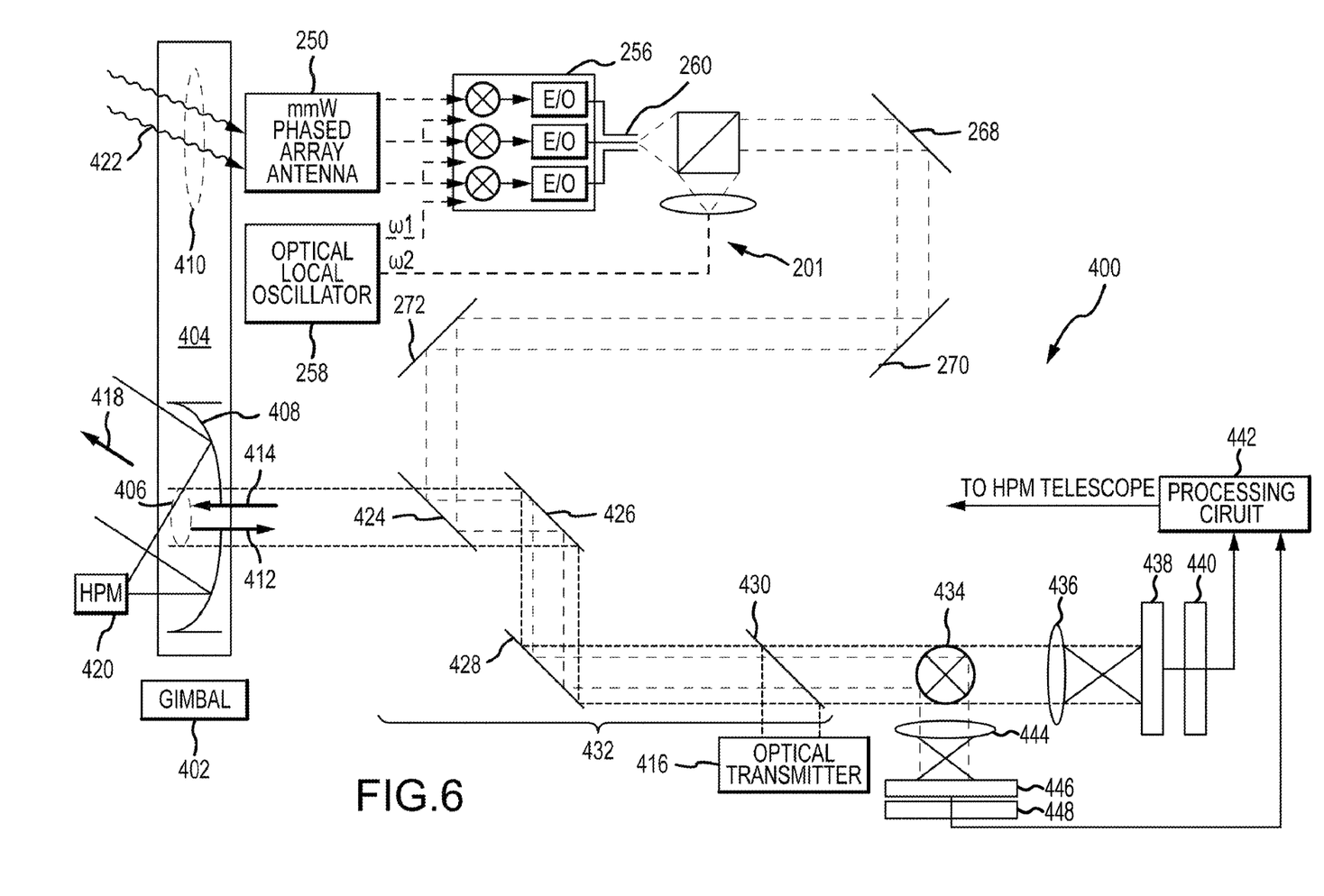
FIG. 6 is an embodiment an HPM DE weapon and PmmW and optical imagers for target tracking.
Figure 7A:
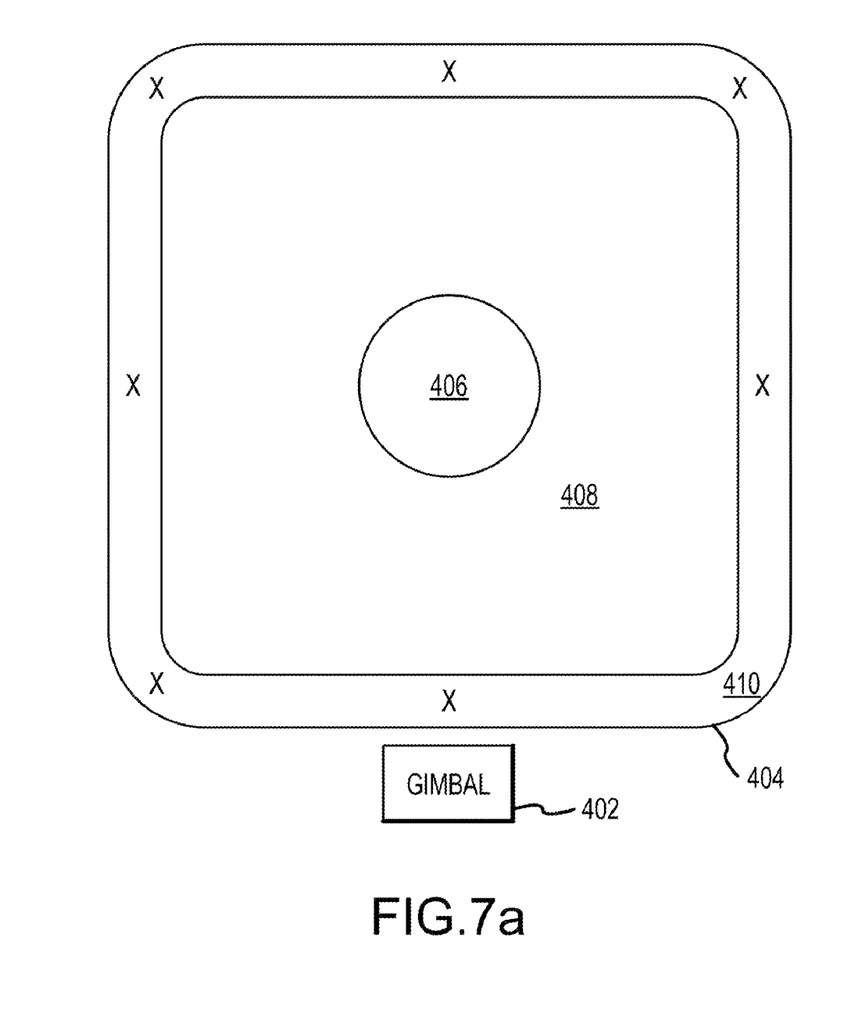
FIGS. 7a and 7b are axial and side views of the gimbaled telescope including an optical aperture and a pair electronic apertures for the HPM source and incident passive mmW radiation.
Figure 7B:
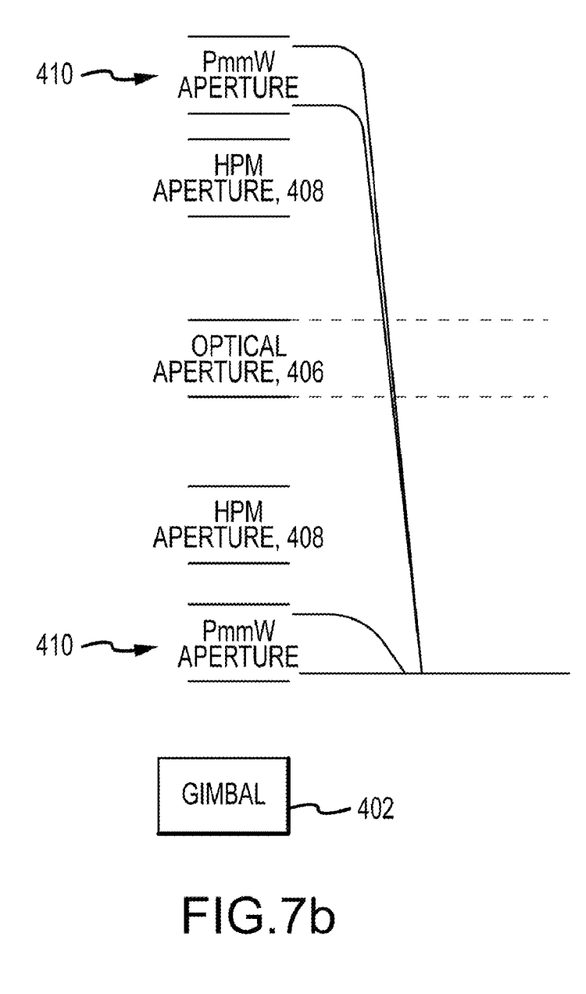

Referring now to FIGS. 6 and 7a-7b, an embodiment of a DE weapon and tracking system 400 uses a HPM source for the DE weapon and combines a PmmW imaging receiver 201 of the type previously described with active/passive optical imaging and laser range finding to provide target tracking information. A gimbal 402 configured to slew and point an axis of a telescope 404 including an optical aperture 406 and first and second electronic aperture 408 and 410 at a target. Optical aperture 406 allows light 412, passive or reflected, from the target to enter and internally generated light 414 such as from an optical transmitter 416 to exit. Electronic aperture 408 allows a directed energy beam 418 from an HPM source 420 to exit towards the target. Electronic aperture 410 allows mmW emissions 422 from the target to enter.

An optical channel is coupled to optical aperture 406 to facilitate light entering or exiting optical aperture 406. Aperture sharing elements 424, 426, 428 and 430 are used to combine and/or separate multiple optical channels into a common signal path 432. Specifically, aperture sharing element 424 combines composite optical signal 232 from PmmW imaging receiver 201 into the common signal path. An interleaver 434 in the common signal path physically separates the optical energy into two separate paths, each corresponding to one of the two wavelength bands for the composite optical signal 232 and light 412, to spatially multiplex the received mmW and optical signals. Composite optical signal 232 is directed through optical detector optics 436 onto a single optical detector array 438 to form a first optical image of a mmW scene. A ROIC 440 reads out the images from the optical detector array 438 and provides them to a processing circuit 442. Light 412 is directed through optical detector optics 444 onto a single optical detector array 446 to form a second optical image of an optical scene. A ROIC 448 reads out the images from the optical detector array 446 and provides them to processing circuit 442, which is configured to process the first and second optical images to provide real-time assessment of target tracking. Processing circuit 442 is also configured to provide control signals to the gimbal to maintain aimpoint on the target during engagement, and provide BDA and tracking information to an operator that may be present.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A directed energy (DE) weapon and tracking system, comprising:
 a gimbal configured to slew and point an axis at a target;
 a telescope on the gimbal, said telescope including at least first aperture, an electronic aperture and an optical aperture;
 a DE weapon including a source of electromagnetic energy for generating and transmitting a directed energy beam through the first aperture to prosecute at least a portion of the target in an active prosecution mode; and
 a passive millimeter wave (PmmW) imaging receiver comprising,
  a phased-array antenna including a plurality of antenna elements mounted within the telescope and arranged in a first pattern configured to receive mmW signals through the second electronic aperture of a mmW scene within a field of view of the PmmW imaging receiver;
  a plurality of electro-optic modulators corresponding to the plurality of antenna elements, each modulator configured to modulate an optical carrier with a received mmW signal to generate a plurality of modulated optical signals;
  a plurality of optical channels configured to carry the plurality of modulated optical signals, each of the plurality of optical channels having an output to emanate the corresponding modulated optical signal out of the corresponding optical channel, the outputs of the plurality of optical channels arranged in a second pattern corresponding to the first pattern; and a first composite signal channel, adjacent to the plurality of outputs of the plurality of optical channels, configured to receive the plurality of modulated optical signals to form a first composite optical signal;

a first optical detector array configured to receive at least a portion of the first composite optical signal and to extract a first optical image of the mmW scene including at least the portion of the target within the directed energy beam; and an optical imaging receiver comprising,
an optical telescope configured to receive optical signals through the optical aperture of an optical scene within a field of view of the optical imaging receiver to form a second composite optical signal, and
a second detector array configured to receive the second composite optical signal and to extract a second optical image of the optical scene including the target, a processing circuit configured to process the first and second optical images to provide real-time assessment of target tracking based on the received mmW signals of the mmW scene during the active prosecution mode and the received optical signals of the optical scene, wherein a resolution of the portion of the target in the mmW scene is coarser than a resolution of the portion of the target in the optical scene;

an optical beam combiner configured to combine the first composite optical signal from the PmmW imaging receiver and ft the second composite optical signal from the optical imaging receiver in a common signal channel;

detector optics in the common signal channel; and an image separation circuit to separate and direct the first and second composite optical signals to the first and second optical detector arrays.

2. The DE weapon and tracking system of claim 1, wherein the processing circuit provides real-time target tracking based on received optical signals during an inactive prosecution mode.

3. The DE weapon and tracking system of claim 2, further comprising an optical transmitter configured to illuminate the optical scene, wherein the processing circuit provides real-time target tracking based on both the received mmw signals and the received optical signals.

4. The DE weapon and tracking system of claim 3, further comprising a ranging circuit for measuring a time of flight between an optical pulse emitted by the optical transmitter and a signal, from the second optical detector array, corresponding to a reflection from the optical scene of the optical pulse.

5. The DE weapon and tracking system of claim 1, wherein the first aperture comprises an electronic aperture, wherein the source of DE weapon comprises a high power microwave (HPM) that generates a directed radio frequency (RF) beam that is transmitted through the electronic aperture.

6. The DE weapon and tracking system of claim 5, wherein the directed RF beam constitutes the only illumination of the target by the DE weapon and tracking system.

7. The DE weapon and tracking system of claim 1, wherein the first aperture comprises an optical aperture, wherein the source of DE weapon comprises a high energy laser (HEL) that generates a directed laser beam that is transmitted through the optical aperture.

8. The DE weapon and tracking system of claim 1, wherein the processing circuit maintains an aimpoint on the target within an area on the target illuminated by the directed energy beam during the active mode prosecution.

9. The DE weapon and tracking system of claim 1, wherein the processing circuit is configured to process the first optical image to extract a battle damage assessment of the target within an area on the target illuminated by the directed energy beam during the active prosecution mode.

10. The DE weapon and tracking system of claim 1, wherein the PmmW imaging receiver provides real-time assessment of target tracking during both active and inactive prosecution modes.

11. The DE weapon and tracking system of claim 1, wherein the first and second optical detectors are a common optical detector array.

12. A directed energy (DE) weapon and tracking system, comprising:
a gimbal configured to slew and point an axis at a target;
a telescope on the gimbal, said telescope comprising an optical aperture and an electronic aperture;
a DE weapon including a high energy laser (HEL) source of electromagnetic energy for generating a directed energy beam;
a passive millimeter wave (PmmW) imaging receiver coupled to the electronic aperture;
an optical imaging receiver coupled to the optical aperture;
one or more optical beam combiners;
at least one optical detector array;
an image separation circuit; and
a processing circuit;
the one or more optical beam combiners being configured to combine an optical signal of the PmmW imaging receiver, an optical signal of the imaging optical receiver, and the electromagnetic energy of the HEL in a common signal path and to transmit the directed energy beam through the optical aperture to prosecute the target,
the PmmW imaging receiver, the one or more optical beam combiners, the image separation circuit and the at least one optical detector array, and the processing circuit being together configured to form, on the at least one optical detector array, a first optical image of a mmW scene within a field of view of the PmmW imaging receiver,
the optical imaging receiver and the one or more optical beam combiners, the image separation circuit, the at least one optical detector array, and the processing circuit being together configured to form, on the at least one optical detector array, a second optical image of an optical scene within a field of view of the optical imaging receiver,
the processing circuit configured to process the first and second optical images to provide real-time assessment of target tracking of the target.

13. The DE weapon and tracking system of claim 12, further comprising an optical transmitter configured to generate an optical signal to illuminate the optical scene, wherein said one or more optical beam combiners combine the optical signal from the optical transmitter in the common signal path.

14. The DE weapon and tracking system of claim 13, wherein the processing circuit provides real-time target tracking based on both the received mmW signals and the received optical signals in a passive sense mode in which the optical transmitter is off.

15. The DE weapon and tracking system of claim 13, further comprising a ranging circuit for measuring a time of flight between an optical pulse emitted by the optical transmitter and a signal, from the second optical detector array, corresponding to a reflection from the optical scene of the optical pulse.

16. The DE weapon and tracking system of claim 12, wherein the processing circuit provides real-time target tracking based on both the received optical and mmW signals during an inactive prosecution mode and real-time target tracking based on at least the received mmW signals during an active prosecution mode.

17. The DE weapon and tracking system of claim 12, wherein a resolution of the portion of the target in the mmW scene is coarser than a resolution of the portion of the target in the optical scene.

* * * * *

UNITED STATES PATENT AND TRADEMARK OFFICE
CERTIFICATE OF CORRECTION

PATENT NO. : 11,536,543 B2
APPLICATION NO. : 16/773257
DATED : December 27, 2022
INVENTOR(S) : Uyeno et al.

It is certified that error appears in the above-identified patent and that said Letters Patent is hereby corrected as shown below:

In the Drawings

On Sheet 1 of 6, and on the title page, the illustrative print figure, reference numeral 170 (First Occurrence), Line 1, delete "170" and insert --169-- therefor On Sheet 2 of 6, Fig. 2, and on the title page, the illustrative print figure, reference numeral 242, Line 2, delete "CIRUIT" and insert --CIRCUIT-- therefor On Sheet 5 of 6, Fig. 6, reference numeral 442, Line 2, delete "CIRUIT" and insert --CIRCUIT-- therefor In the Specification In Column 5, Line 52, delete "150" and insert --152-- therefor In Column 6, Line 51, delete "170" and insert --169-- therefor In Column 6, Line 54, delete "170" and insert --169-- therefor In Column 6, Line 58, delete "170" and insert --169-- therefor In Column 7, Line 1, delete "172" and insert --170-- therefor In Column 7, Line 2, delete "172" and insert --170-- therefor In Column 7, Line 5, delete "174" and insert --172-- therefor In Column 7, Line 6, delete "172," and insert --170,-- therefor Signed and Sealed this
Fifth Day of March, 2024

Katherine Kelly Vidal
*Director of the United States Patent and Trademark Office*

CERTIFICATE OF CORRECTION (continued)
U.S. Pat. No. 11,536,543 B2

In Column 8, Line 41, delete "280" and insert --272-- therefor

In Column 8, Line 50, delete "w1" and insert --ω1-- therefor

In the Claims

In Column 10, Line 56, in Claim 1, after "the", delete "second"

In Column 11, Line 34, in Claim 1, after "and", delete "ft"

In Column 11, Line 48, in Claim 3, delete "mmw" and insert --mmW-- therefor